United States Patent
Morris et al.

(10) Patent No.: US 6,997,673 B2
(45) Date of Patent: Feb. 14, 2006

(54) GAS TURBINE HIGH TEMPERATURE TURBINE BLADE OUTER AIR SEAL ASSEMBLY

(75) Inventors: Mark C. Morris, Phoenix, AZ (US); Steve H. Halfmann, Chandler, AZ (US); Craig A. Wilson, Mesa, AZ (US); Shawn J. Pollock, Phoenix, AZ (US); Carl A. Larson, Sedona, AZ (US)

(73) Assignee: Honeywell International, Inc., Morristown, NJ (US)

( * ) Notice: Subject to any disclaimer, the term of this patent is extended or adjusted under 35 U.S.C. 154(b) by 103 days.

(21) Appl. No.: 10/734,922

(22) Filed: Dec. 11, 2003

(65) Prior Publication Data

US 2005/0129499 A1 Jun. 16, 2005

(51) Int. Cl.
*F01D 25/12* (2006.01)
*F01D 11/08* (2006.01)
*F01D 25/24* (2006.01)

(52) U.S. Cl. ............... 415/1; 415/139; 415/173.1; 415/178; 415/214.1

(58) Field of Classification Search ............ 415/1, 415/115, 119, 134, 139, 173.1, 173.4, 174.2, 415/175, 176, 177, 178, 179, 180, 196, 197, 415/200, 213.1, 214.1; 29/889.2, 889.22; 416/179, 189, 190, 191; 277/652
See application file for complete search history.

(56) References Cited

U.S. PATENT DOCUMENTS

| | | | |
|---|---|---|---|
| 3,986,720 A * | 10/1976 | Knudsen et al. ............ 415/136 |
| 5,167,487 A | 12/1992 | Rock |
| 5,188,506 A * | 2/1993 | Creevy et al. ............... 415/115 |
| 5,197,853 A | 3/1993 | Creevy et al. |
| 5,273,396 A * | 12/1993 | Albrecht et al. .......... 415/173.1 |
| 5,301,595 A | 4/1994 | Kessie |
| 5,377,525 A | 1/1995 | Hutchinson et al. |
| 5,593,276 A * | 1/1997 | Proctor et al. ........... 415/173.1 |
| 5,741,980 A | 4/1998 | Hill et al. |
| 5,964,575 A * | 10/1999 | Marey ........................ 415/115 |
| 6,197,424 B1 * | 3/2001 | Morrison et al. ........ 416/241 R |
| 6,270,311 B1 | 8/2001 | Kuwabara et al. |
| 6,354,795 B1 | 3/2002 | White et al. |
| 6,575,697 B1 * | 6/2003 | Arilla et al. ............. 415/173.1 |
| 2003/0049121 A1 | 3/2003 | Dierksmeier et al. |
| 2003/0133790 A1 | 7/2003 | Darkins, Jr. et al. |
| 2003/0185674 A1 * | 10/2003 | Alford et al. ............. 415/173.1 |
| 2004/0120808 A1 * | 6/2004 | Alford et al. ............. 415/173.1 |

* cited by examiner

*Primary Examiner*—Edward K. Look
*Assistant Examiner*—Richard A. Edgar
(74) *Attorney, Agent, or Firm*—Ingrassia Fisher & Lorenz (57) ABSTRACT

A turbine shroud assembly includes forward and aft hangers, an axisymmetric plenum assembly, ceramic shroud segments, ceramic spacers, and forward and aft rope seals. The plenum assembly supplies impingement cooling to the shroud and the hangers. The impingement cooling to the forward and aft hangers is controlled independently to improve blade tip clearance. The rope seals are radially inward from the hangers and reduce cooling flow leakage. The turbine shroud assembly can operate in a higher temperature environment using less cooling flow than the prior art.

29 Claims, 6 Drawing Sheets

GAS TURBINE HIGH TEMPERATURE TURBINE BLADE OUTER AIR SEAL ASSEMBLY

GOVERNMENT INTERESTS

The invention was made with Government support under contracts with the US Army (DAAJ02-94-C-0030), the US Air Force (F33615-94-C-2507) and the US Navy (N00019-94-C-0036). The Government has certain rights in this invention.

BACKGROUND OF THE INVENTION

The present invention generally relates to gas turbine engine systems and, more particularly, to high pressure turbine (HPT) blade outer air seal (BOAS) assemblies, also known as turbine shroud assemblies.

Turbine shroud assemblies have been used extensively in gas turbine engines. The turbine shroud assembly may be positioned immediately downstream of an HPT nozzle. The turbine shroud assembly may surround a HPT rotor and may define an outer boundary of a high temperature gas flow path through the HPT. During engine operation, exposure to the high temperature gas flow may result in failure of the turbine shroud components. Due to the differing expansion of rotor and turbine shroud assembly components, it may also result in contact between the turbine shroud assembly and the blade tips of the rotor. A small amount of cooling air from a compressor may be used to decrease some of the adverse effects of the high temperature gas flow.

Minimizing the amount of air necessary to cool the turbine shroud assembly is desirable because engine efficiency decreases as the amount of cooling air increases. Methods for minimizing the cooling air necessary may include decreasing cooling air leakage from the assembly or reducing the cooling needs of the system by increasing the effectiveness of the cooling scheme.

Turbine shroud assemblies have experienced significant distress due to a lack of robust sealing of the assembly. This leakage may result in a significant reduction in the cooling cavity pressure (and back flow margin), which can result in hot gas ingestion and distress in the hardware. Back flow margin is the ratio of the difference between the shroud cooling cavity pressure and the flow path pressure to the flow path pressure. If the back flow margin of the assembly becomes negative (or for some designs even a low positive number), hot flow path gas may ingest into portions of the shroud and may cause significant distress. The challenge in maintaining good back flow margin is due to the difficulty in sealing the various leak paths that allow the cooling air to escape from the shroud cooling cavity.

Several methods of reducing cooling air leakage have been disclosed. These methods include the use of labyrinth type seals and metallic platform seals. Unfortunately, labyrinth seals are not suitable for some applications, and the metallic platform seals, which are secured in machined grooves in the sides of the segments, may fail in the operating environment of some engines. In addition, assembly technicians may cut themselves on the small, sharp metallic platform seals.

Methods of reducing system cooling needs have also been disclosed. Manufacturing the assembly components from more robust materials and utilizing thermal barrier coatings (TBC) have been described. Designs that utilize TBC to keep the shrouds insulated from the hot flow path gas can experience delamination of the TBC, which may result in shroud distress, which may result in large turbine blade tip clearances. The subsequent increase in turbine blade tip clearance significantly hurts fuel consumption and also results in an increase in turbine inlet temperature, which further distresses the hardware.

Methods of increasing the effectiveness of cooling configurations have been disclosed. In one method complex arrays of film cooling holes have been drilled into shroud segments. Although this results in increased cooling of the turbine shroud assembly, all edges of the shroud segments may not be sufficiently cooled and system integrity may suffer.

Turbine shroud assemblies having increased cooling of the shroud segment edges have been disclosed in U.S. Pat. No. 6,270,311. This invention utilizes an interlocking hook/shelf on the ends of the segments in conjunction with conventional feather seals and slots to produce an end gap seal between the adjacent circumferential segments. In addition, this invention uses film cooling holes to reinforce cooling at the sides of the segment. Although cooling of the shroud segment edges is increased, the metallic feather seals may suffer distress at higher operating temperatures, which may result in a loss of back flow margin to the assembly.

Another turbine shroud assembly has been disclosed in U.S. patent application No. 2003/0133790. This invention requires that the turbine shroud segment and the shroud segment hanger both are segmented arcs. This invention relies on tight tolerances to minimize leakage of the assembly. Sliding the turbine shroud segment into the shroud segment hanger requires tight tolerances to keep the air seal along the forward and aft hooks. Unfortunately, the tolerances needed may result in increased production costs of the turbine shroud assembly. In addition, fine-tuning of the thermal expansion of the forward and aft hangers may not be possible. Further, to change cooling flows, this invention requires that every shroud segment hanger be reworked.

Turbine shroud assemblies having increased cooling efficiency have been disclosed in U.S. Pat. No. 5,188,506. This design incorporates a rope seal radially outside of the segment forward hook to reduce the leakage of cooling air through the forward hook region of the shroud support. Unfortunately, the forward hook of this assembly may be exposed to hot ingested flow path air. Also, fine tuning of the thermal growth of the forward hanger may not be possible. Further, the disclosed assembly may not allow for sufficient axial motion of the shroud segment as the pressure loads move the segment aft. Because turbine inlet temperatures will continue to rise to achieve greater thrust to weight capability and improved fuel consumption, still further improvements are needed.

As can be seen, there is a need for improved turbine shroud assemblies. Additionally, assemblies are needed wherein cooling air flow is minimized while allowing for increased gas flow temperatures. Further, turbine shroud assemblies are needed wherein blade tip clearance is decreased. Moreover, turbine shroud assemblies having improved cooling schemes to the forward and aft hangers are needed. Also, assemblies are needed that have reduced cooling air leakage and improved shroud segment sealing.

SUMMARY OF THE INVENTION

In one aspect of the present invention, a turbine shroud assembly comprises a plurality of shroud segments assembled circumferentially about a longitudinal engine centerline axis, each shroud segment having a forward hook and an aft hook; a plurality of spacer channels positioned on the radially outward side of the shroud segments, such that one spacer channel is in contact with each interface of two shroud segments; a plurality of ceramic spacer seals positioned in contact with the spacer channels, such that one ceramic spacer seal is within each spacer channel; a forward hanger, comprised of a plurality of forward hanger rails positioned radially outward from the shroud segments, the forward hanger rails capable of engaging the shroud segment forward hooks, the forward hanger rails having an o-ring groove positioned circumferentially on a radially inward side; an aft hanger positioned radially outward from the shroud segments, the aft hanger comprised of a rail capable of engaging the shroud segment aft hooks, the aft hanger rail having an angled surface positioned on the forward edge of the radially inward side; and a plenum assembly positioned between and in contact with the forward hanger and the aft hanger.

In yet another aspect of the present invention, a turbine shroud assembly comprises a plurality of ceramic shroud segments assembled circumferentially about a longitudinal engine centerline axis, each ceramic shroud segment having a forward hook and an aft hook; and a plurality of ceramic spacer seals positioned in contact with the ceramic shroud segments, such that each ceramic spacer seal is in contact with the radially outward side of two ceramic shroud segments.

In another aspect of the present invention, a turbine shroud assembly comprises a plurality of shroud segments assembled circumferentially about a longitudinal engine centerline axis, each shroud segment comprising a monolithic silicon nitride ceramic and having a forward hook and an aft hook; a plurality of spacer channels positioned on the radially outward side of the shroud segments, such that one spacer channel is in contact with each interface of two shroud segments; a plurality of ceramic spacer seals comprising a monolithic silicon nitride ceramic, the ceramic spacer seals positioned in contact with the spacer channels, such that one ceramic spacer seal is within each spacer channel; a forward hanger comprising a nickel based alloy, positioned radially outward from the shroud segments, the forward hanger rails capable of engaging the shroud segment forward hooks, the forward hanger rails having an o-ring groove positioned circumferentially on a radially inward side; a forward rope seal positioned between and in contact with the o-ring groove and the shroud segments; an aft hanger comprising a nickel based alloy, positioned radially outward from the shroud segments, the aft hanger rail capable of engaging the shroud segment aft hooks, the aft hanger rail having an angled surface positioned on the forward edge of the radially inward side; an aft rope seal positioned between and in contact with the angled surface and the shroud segments; a plenum assembly positioned between and in contact with the forward hanger and the aft hanger, the plenum assembly comprising an axisymmetric plenum balloon having an impingement cooling array there through, a plurality of flow metering openings in fluid communication with the axisymmetric plenum balloon, and a plurality of inlet openings in flow communication with the flow metering openings.

In another aspect of the present invention, an apparatus for a turbine engine comprises an axisymmetric plenum balloon having an impingement cooling array there through; a plurality of flow metering openings in fluid communication with the axisymmetric plenum balloon; and a plurality of inlet openings in flow communication with the flow metering openings.

In still another aspect of the present invention, a rope seal apparatus for use between a turbine shroud and a turbine hanger comprises a compressed hybrid ceramic rope positioned between and in contact with the turbine shroud and the turbine hanger, such that the turbine hanger is radially outward from the compressed hybrid ceramic rope.

In a further aspect of the present invention, a method of shielding a turbine engine structure from a hot gas flow path there through comprises the steps of providing a plurality of ceramic shroud segments assembled circumferentially about a longitudinal engine centerline, a forward hanger radially outward from and forward of the ceramic shroud segments, an aft hanger radially outward from and aft of the ceramic shroud segments, and a plenum assembly between and in contact with the forward hanger and the aft hanger; and supplying a cooling flow to the plenum assembly such that the cooling flow impinges the ceramic shroud segments, the forward hanger, and the aft hanger.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides high pressure turbine (HPT) blade outer air seal (BOAS) assemblies, also known as turbine shroud assemblies and methods for producing the same. The turbine shroud assemblies produced according to the present invention may find beneficial use in many industries including aerospace and industrial. The turbine shroud assemblies of the present invention may be beneficial in applications including electricity generation, naval propulsion, pumping sets for gas and oil transmission, aircraft propulsion, automobile engines, and stationary power plants. This invention may be useful in any gas turbine application.

In one embodiment, the present invention provides a turbine shroud assembly for an HPT stage. The turbine shroud assembly may be positioned immediately downstream of an HPT nozzle. The turbine shroud assembly may surround an HPT rotor and may define an outer boundary of a high temperature gas flow path through the HPT. Cooling flow from a compressor may be utilized to cool the turbine shroud assembly. The turbine shroud assembly of the present invention may comprise a plenum assembly positioned between forward and aft hangers. Unlike the prior art, the plenum assembly may comprise an axisymmetric plenum balloon having an impingement cooling array there through. The impingement cooling array may provide cooling flow to the shroud segments and, unlike the prior art, it may also provide cooling flow to the forward and aft hangers. One of the significant advantages of this design over the prior art may be the ability to customize the heat transfer to the forward and aft hangers, which govern the radial position of the shroud segments, which in turn govern the turbine rotor tip clearance. This unique advantage over the prior art helps maintain tight turbine tip clearance for improved performance. Another advantage over the prior art is that any leakage from the combustor plenum that occurs between the forward hanger and the plenum assembly, or from between the aft hanger and the plenum assembly, may not be wasted air. It may act to supercharge the impingement cooling air cavity of the turbine shroud assembly to help maintain positive back flow margin to the assembly.

The plenum assembly of the present invention, unlike the prior art, may comprise inlet openings and flow metering openings. These openings may provide a method of pressure recovery for axial flow combustor plenums, may serve to minimize the cooling flow circuit sensitivity to varying or uncertain orifice discharge coefficients that are common with combustor plenums that suffer from significant circumferential swirl, may straighten the cooling flow as it flows radially inward, and may control the overall amount of cooling flow to the plenum assembly. Further, unlike the prior art, a cooling flow change can be made to the present turbine shroud assembly by simply modifying the flow metering opening diameter or number of flow metering openings. With the prior art designs, each of the shroud segments may be required to undergo modifications. In addition, many engine designs require that the turbine case undergo modifications as well. This may not be required with the present invention.

The turbine shroud assembly of the present invention may comprise hybrid ceramic rope seals at the forward and aft portions of the shroud assembly. Unlike the prior art, the hybrid ceramic rope seals of the present invention may be positioned radially inward from the hangers to reduce hanger exposure to the hot gas flow. Cooling flow leakage may be reduced and cooling cavity pressure may be maintained. By controlling the relative compression in the hybrid ceramic rope seals, an optimized flow distribution may be maintained through the turbine shroud assembly that is not possible in the prior art. Additionally, unlike the prior art that allows the air to escape far from the flow path, the cooling flow from the hybrid rope seals may be channeled directly along the shroud segment to help cool the shroud segment and provide purging of the hot flow path gas away from the turbine shroud assembly.

Figure 1:
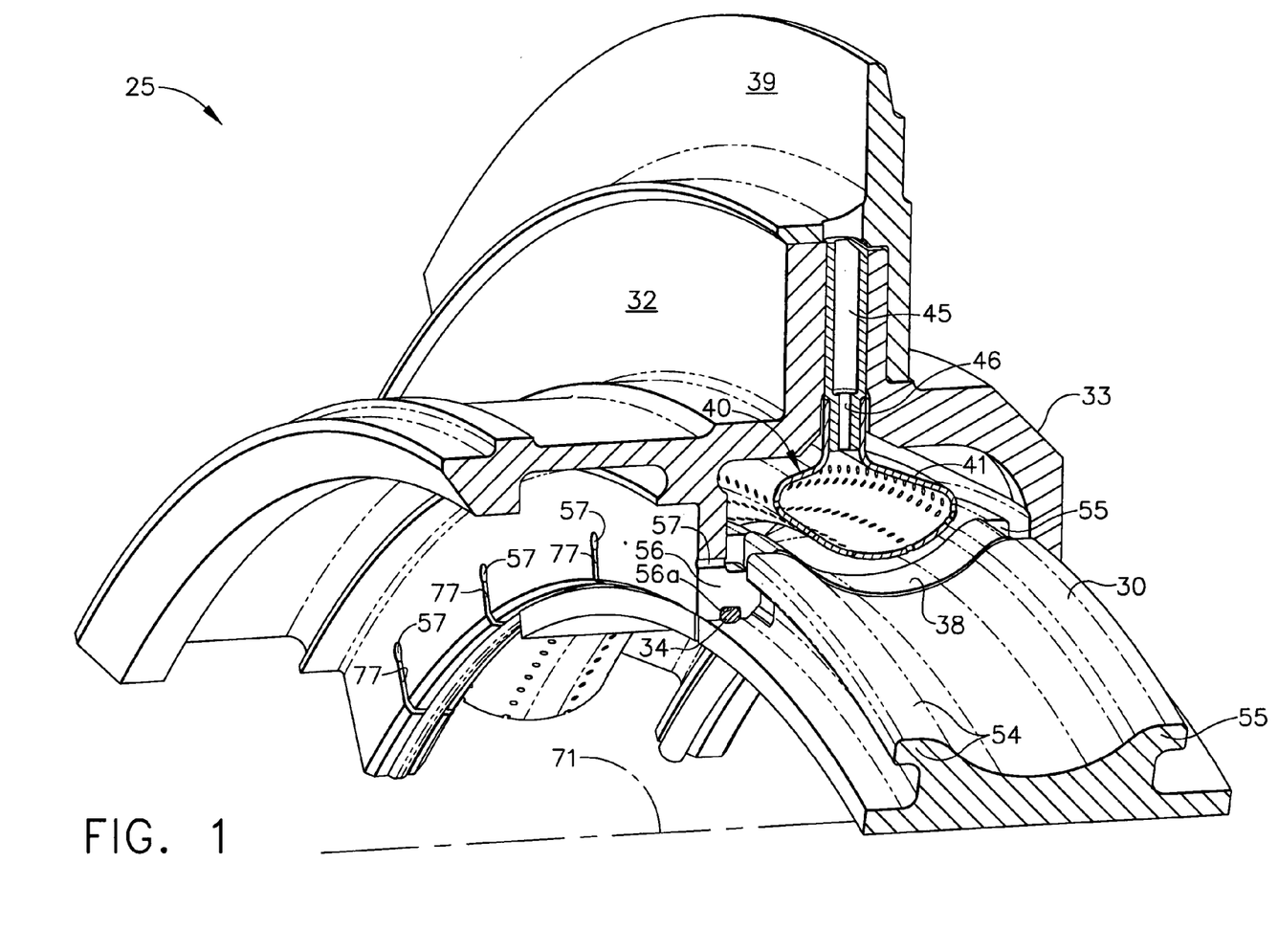
FIG. 1 is a partial, cut-away perspective view of a turbine shroud assembly according to one embodiment of the present invention.

As seen in FIG. 1, a turbine shroud assembly 25 may comprise a shroud segment 30, a ceramic spacer seal 38, a forward hanger 32, an aft hanger 33, a vertical flange 39, and a plenum assembly 40. As better seen in FIG. 2, a turbine shroud assembly 25 may further comprise a forward rope seal 34 and an aft rope seal 35. A turbine shroud assembly 25 may further comprise a thermal barrier coating (TBC) 31, a forward spacer radial retainer 36, and an aft spacer radial retainer 37, as seen in FIG. 3.

The turbine shroud assembly 25 may comprise a plurality of shroud segments 30. Each shroud segment 30 may comprise a forward hook 54 and an aft hook 55 capable of engaging the forward hanger rails 56 and aft hanger rail 58, respectively. The shroud segments 30 may be assembled circumferentially about a longitudinal engine centerline axis 71, as shown in FIG. 1. The shroud segments 30 are positioned such that they surround a HPT rotor (not shown) and define an outer boundary of a high temperature gas flow path through the HPT. The shroud segments 30 may comprise a very high temperature capable ceramic, such as monolithic silicon nitride ceramic. Useful ceramics may include AS800® silicon nitride monolithic ceramic available from Honeywell International, Inc. The shroud segments 30 may be machined out of a full ring and cut into segments. The shroud segments 30 may have a thickness between about 0.25 and about 0.50 inches.

Figure 5:
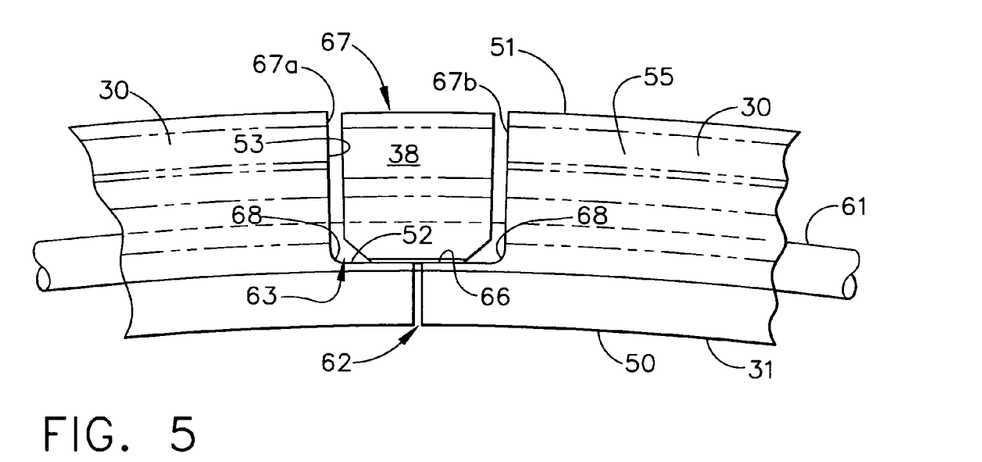
FIG. 5 is a partial sectional view looking aft of a turbine shroud assembly according to one embodiment of the present invention.

Each shroud segment 30 may be provided with two edge channels 67a and 67b, one on each circumferential end of the shroud segment. As shown in FIG. 5, each edge channel 67a and 67b is comprised of a flat radial surface 53, a flat circumferential surface 52, and a fillet 68 positioned at the interface of flat radial surface 53 and flat circumferential surface 52. The flat circumferential surface 52 includes the edge of a shroud segment 30 that is adjacent to the edge of a second shroud segment 30 when the shroud segments 30 are positioned circumferentially in the shroud assembly. Two edge channels 67a and 67b may be positioned at a platform gap 62 between two circumferentially assembled shroud segments 30 to form a spacer channel 67. The spacer channel 67 may be capable of receiving a ceramic spacer seal 38 to create seal 66 at the interface between flat circumferential surface 52 and the radial inward surface of the ceramic spacer seal 38, thus minimizing cooling flow leakage out the platform gap 62. The edge channels 67a and 67b may have a depth between about 0.05 and about 0.40 inches. The edge channels 67a and 67b may be provided by known manufacturing methods. The shroud segments 30 may be thermally controlled by utilizing a thermal barrier coating (TBC) 31 on the hot gas flow path side 50 (radially inward side) of the shroud segment 30 and by impingement cooling of the shroud segments 30 on the back side 51.

Thermal barrier coatings (TBC) 31 are known in the art and may be applied to the hot gas flow path side 50 of the shroud segments 30. A useful TBC 31 may be Zircoat™ (by PRAXAIR) and may be applied by plasma spray technique. The TBC 31 may provide thermal insulation against the hot gas flow and may reduce the cooling requirement of the shroud segments 30. The turbine shroud assembly 25 may experience outward radial movement due to thermal expansion. The forward end 72 of the shroud segment 30 and the aft end 73 of the shroud segment 30 may experience different rates of outward radial movement. The forward end 72 may be the end of the shroud segment 30 that is closest to the forward hanger 32. The aft end 73 may be the end of the shroud segment 30 that is closest to the aft hanger 33. The radial movement of the forward end 72 during engine operation may be a function of the thermal growth of the forward hanger 32. The radial movement of the aft end 73 during engine operation may be a function of the thermal growth of the aft hanger 33. To compensate for the differential radial thermal growth between the forward hanger 32 and aft hanger 33, the thermal barrier coating 31 may be ground to a conical profile during manufacturing. The thickness of the TBC 31 across the shroud segment 30 may vary from the forward end 72 to the aft end 73 such that the end of the shroud segment 30 that experiences the greater outward radial movement may have thicker TBC 31. This may achieve an optimized cylindrical profile during engine operation, which may maintain robust turbine tip clearance control. Because the present invention may be designed for applications that run at turbine inlet temperatures that can melt or fail even nickel based superalloys, the shroud segments 30 may be sealed at their flat circumferential surfaces 52 with ceramic spacer seals 38.

Ceramic spacer seals 38 may fit into the spacer channels 67, as shown in FIG. 5. One ceramic spacer seal 38 may fit simultaneously into two edge channels 67a and 67b, one edge channel on each of two adjacent circumferentially assembled shroud segments 30, as shown in FIG. 5. One ceramic spacer seal 38 may be positioned in each spacer channel 67. Due to manufacturing limitations and thermal growth considerations, the turbine shroud assembly 25 may comprise platform gaps 62 and fillet/chamfer gaps 63. The platform gap 62 may be the gap between adjacent shroud segments 30. The fillet/chamfer gap 63 may be the gap between a shroud segment 30 and a ceramic spacer seal 38. The ceramic spacer seals 38 may conform to the same circumferential cross section as the shroud segments 30 but without the forward hooks 54 and aft hooks 55, as shown in FIG. 3. The ceramic spacer seals 38 may comprise a ceramic, such as monolithic silicon nitride ceramic. The ceramic spacer seals 38 may have a thickness between about 0.05 and about 0.4 inches. The thickness of the ceramic spacer seals 38 may be about equal to the depth of the edge channels 67a and 67b.

The ceramic spacer seals 38 may be radially retained with forward spacer radial retainers 36 and aft spacer radial retainers 37, as shown in FIG. 3. Any known retaining means may be useful for radially retaining the ceramic spacer seals 38. The forward spacer radial retainers 36 and aft spacer radial retainers 37 may comprise known sheet metal retaining rings. During engine operation, the pressure loading of the turbine shroud assembly 25 may secure the ceramic spacer seals 38 to the shroud segments 30, resulting in an exceptional high temperature seal that would not be possible utilizing the prior art. The shroud segments 30 and ceramic spacer seals 38 may shelter the forward hanger rails 56 and aft hanger rail 58 from the hot flow path gases. The ceramic spacer seals 38 and the shroud segments 30 may be retained axially by the forward hanger 32 and the aft hanger 33.

The turbine shroud assembly 25 may comprise forward hanger 32 and aft hanger 33. The forward hanger 32 and aft hanger 33 may comprise high strength nickel base superalloys, such as Mar-M-247. For some applications, the forward hanger 32 and aft hanger 33 may comprise metal-alloys including nickel based alloys and cobalt based alloys. Useful metal alloys may include Single Crystal SC180 available from Honeywell, Mar-M-247 Eqx material available from Martin Marietta, HA230 available from Haynes International, and MA754 available from Special Metals. The forward hanger 32 and aft hanger 33 may be formed by known manufacturing methods. The forward hanger 32 and aft hanger 33 may govern the overall thermal growth of the turbine shroud assembly 25. The thermal expansion of the forward hanger 32 and aft hanger 33 may be a function of hanger cooling and material selection. The forward hanger 32 and aft hanger 33, which may be cooled independently, may allow for optimal thermal growth and precise turbine tip clearance control. For example, the impingement cooling flow to the forward hanger 32 and aft hanger 33 may be altered by altering the impingement cooling array 47, which in turn may alter the thermal expansion of the hangers and may alter turbine tip clearance. The result may be improved turbine tip clearance and thus improved fuel consumption for the engine.

The turbine shroud assembly 25 may comprise an aft rope seal 35 between the aft hanger rail 58 and the shroud segments 30. The aft rope seal 35 may comprise a hybrid ceramic rope 61, as shown in FIG. 3. The hybrid ceramic rope 61 may comprise a rope core of braided ceramic fibers encapsulated in a metallic braided outer sheath. Useful hybrid ceramic ropes 61 may include those similar to U.S. Pat. No. 5,301,595, which is incorporated herein by reference. The hybrid ceramic rope 61 may be compression tested to verify the load on the shroud segments 30 and may be flow tested to quantify cooling flow as a function of compression. The diameter of a useful hybrid ceramic rope 61 may be between about 0.04 and about 0.20 inches. The diameter of a preferred hybrid ceramic rope 61 may be between about 0.045 and about 0.080 inches. The diameter of a more preferred hybrid ceramic rope 61 may be between about 0.05 and about 0.06 inches.

Figure 6:
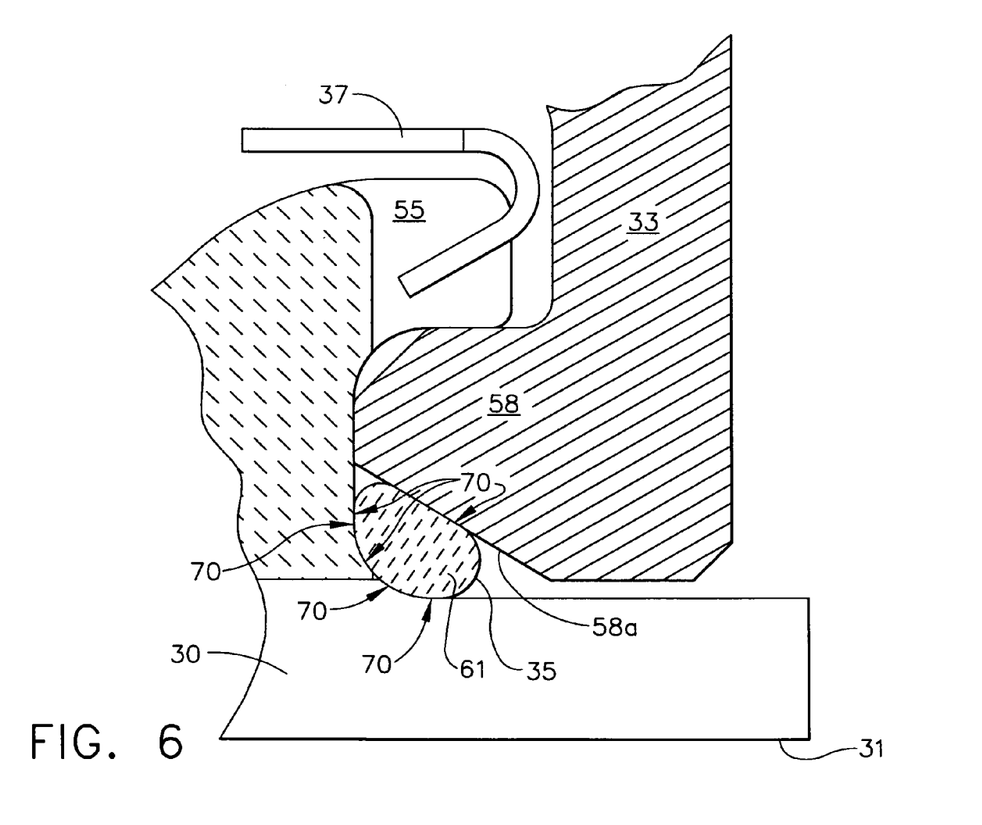
FIG. 6 is a partial cross sectional view of a turbine shroud assembly according to one embodiment of the present invention.

For proper positioning of the hybrid ceramic rope 61 and formation of the aft rope seal 35, the aft hanger rail 58 may be provided with an angled surface 58a at the forward end of the radially inner surface, as shown in FIGS. 3 and 6. The angled surface 58a may be provided by known manufacturing techniques. Force balance analysis may be utilized for determining a useful angle of the angled surface 58a. The forces affecting the aft rope seal 35 may be at static equilibrium (force balance) during engine operation such that the hybrid ceramic rope 61 may maintain contact with the shroud segment 30 and the angled surface 58a. A property of force is that the superposition of forces satisfies the laws of vector addition. When the forces acting on the hybrid ceramic rope 61 equal zero, the hybrid ceramic rope 61 will not be in motion, thus not extruded. The sum of the forces affecting the aft rope seal 35 may be zero. Factors affecting these forces may include the compression of the hybrid ceramic rope 61, the pressure load from the cooling flow 60, the angle of the angled surface 58a, and the frictional coefficients of the materials. The magnitude of the forces affecting the aft rope seal 35 may vary by application. Friction testing systems may be useful in determining the forces due to friction. Useful friction testing systems may include those described in U.S. Pat. No. 5,377,525, which is incorporated herein by reference.

Figure 8:
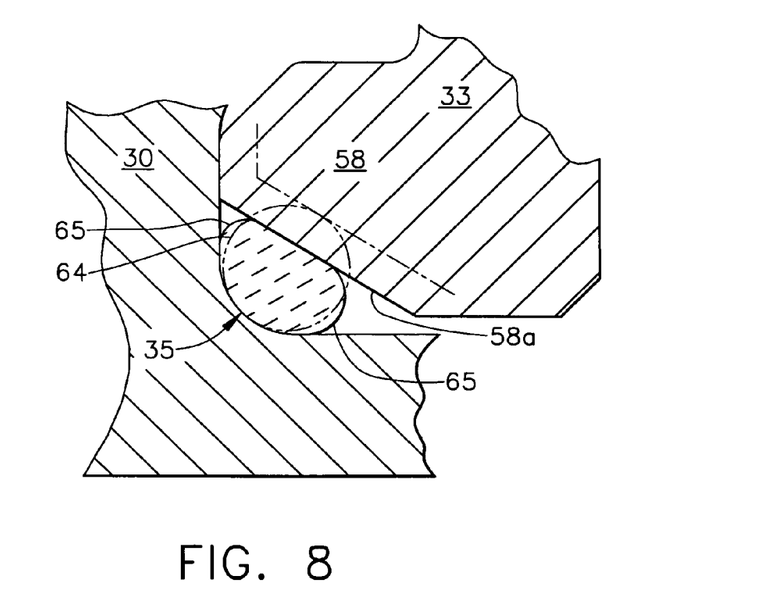
FIG. 8 is a partial cross sectional view of an aft rope seal according to one embodiment of the present invention.

During manufacture of the turbine shroud assembly 25, an uncompressed form 64 of the hybrid ceramic rope 61 may be positioned circumferentially about the shroud segments 30 and positioned radially inward of the aft hook 55 of the shroud segment 30. The aft hanger rail 58 may be engaged axially to produce the compressed form 65, as seen in FIG. 8. During manufacture of the turbine shroud assembly 25, the hybrid ceramic rope 61 may be compressed between the aft hanger rail 58, the ceramic spacer seals 38, and the shroud segments 30. In this compressed state, the hybrid ceramic rope 61 may form an aft rope seal 35. As is known in the art, a flow analysis test may be performed to determine the desired compression. Useful flow analysis systems may include those described in U.S. Pat. No. 5,741,980, which is incorporated herein by reference.

Figure 7:
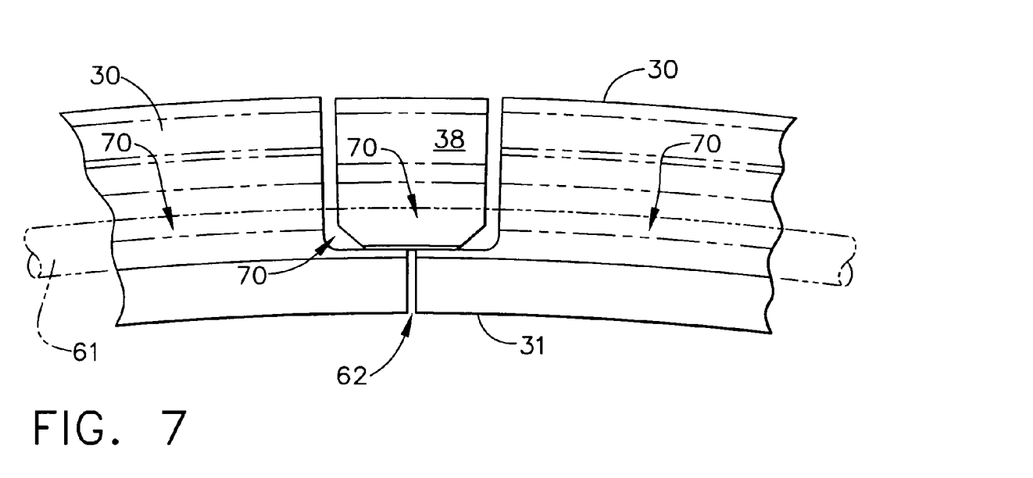
FIG. 7 is a partial sectional view looking forward of a turbine shroud assembly according to one embodiment of the present invention.

The aft rope seal 35 may provide axial sealing and radial sealing. The hybrid ceramic rope 61 may be compressed in such a way as to simultaneously form a seal at a plurality of sealing areas 70, as shown in FIGS. 6 and 7. The sealing areas 70 may include a portion of the aft side of the ceramic spacer seal 38, a portion of the aft side of the shroud segment 30, the angled surface 58a, the platform gap 62, and the fillet/chamfer gap 63. As can be seen, the hybrid ceramic rope 61 may contact the aft face of the ceramic spacer seals 38 at a location between adjacent shroud segments 30 to minimize radial leakage from the ceramic spacer seals 38. The hybrid ceramic rope 61 may also seal the fillet/chamfer gap 63 created by the ceramic spacer seal 38 chamfer. The reaction load for static equilibrium and final sealing on the angled surface 58a of the aft hanger rail 58 may occur to secure the aft rope seal 35 and preclude extrusion of the hybrid ceramic rope 61 out of the gap between the angled surface 58a and the shroud segments 30. The aft rope seal 35 may provide a robust flow circuit that minimizes hot gas ingestion if a loss of back flow margin were to occur. For prior art seals, such as platform seals, when there is a loss of back flow margin, hot gas ingestion may occur unimpeded. The aft rope seal 35 of the present invention may be a physical impedance to hot gas ingestion.

The turbine shroud assembly 25 may comprise a forward rope seal 34 between the forward hanger rails 56 and the shroud segments 30. The forward rope seal 34 may comprise a hybrid ceramic rope 61. The forward hanger rails 56 may be provided with o-ring grooves 56a. An o-ring groove 56a may be positioned circumferentially on the radially inner surface of a forward hanger rail 56, as shown in FIG. 3. The o-ring grooves 56a may be formed by known methods and may be capable of forming a forward rope seal 34. The cross-sectional area of the o-ring groove 56a may be less than the cross-sectional area of the hybrid ceramic rope 61. The hybrid ceramic rope 61 may be positioned in the o-ring groove 56a. The forward hanger rails 56 then may axially engage the forward hook 54 of the shroud segment 30 to form the forward rope seal 34.

During manufacturing of the turbine shroud assembly 25, the hybrid ceramic rope 61 may be positioned in the o-ring groove 56a. The hybrid ceramic rope 61 may be compressed between the forward hanger rails 56 and the shroud segments 30. In this compressed state, the hybrid ceramic rope 61 may produce a forward rope seal 34. The forward rope seal 34 may be a typical "o-ring" type seal. The forward rope seal 34 may allow axial movement between the shroud segments 30 and the forward hanger 32 while maintaining a controlled amount of flow to purge the cavity forward of the forward hanger 32.

The turbine shroud assembly 25 may utilize the axial movement in the forward rope seal 34 to compensate for the differential axial thermal growth between the forward hanger 32 and aft hanger 33, while the aft rope seal 35 may maintain cooling back flow margin by controlling leakage across multiple sealing areas 70. Altering the compression of the hybrid ceramic rope 61, which forms the forward rope seal 34 and the aft rope seal 35, may alter the amount of cooling flow 60 exiting below the forward hanger 32 and aft hanger 33. A useful amount of cooling flow 60 exiting below the forward hanger 32 and aft hanger 33 may vary by application. The rate of flow through the hybrid ceramic rope 61 may be a function of the compression of the hybrid ceramic rope 61. The hybrid ceramic rope 61 of the aft rope seal 35 may be more compressed than the hybrid ceramic rope 61 of the forward rope seal 34. This may allow a greater amount of cooling flow 60 to exit below the forward hanger 32 than below the aft hanger 33.

Figure 2:
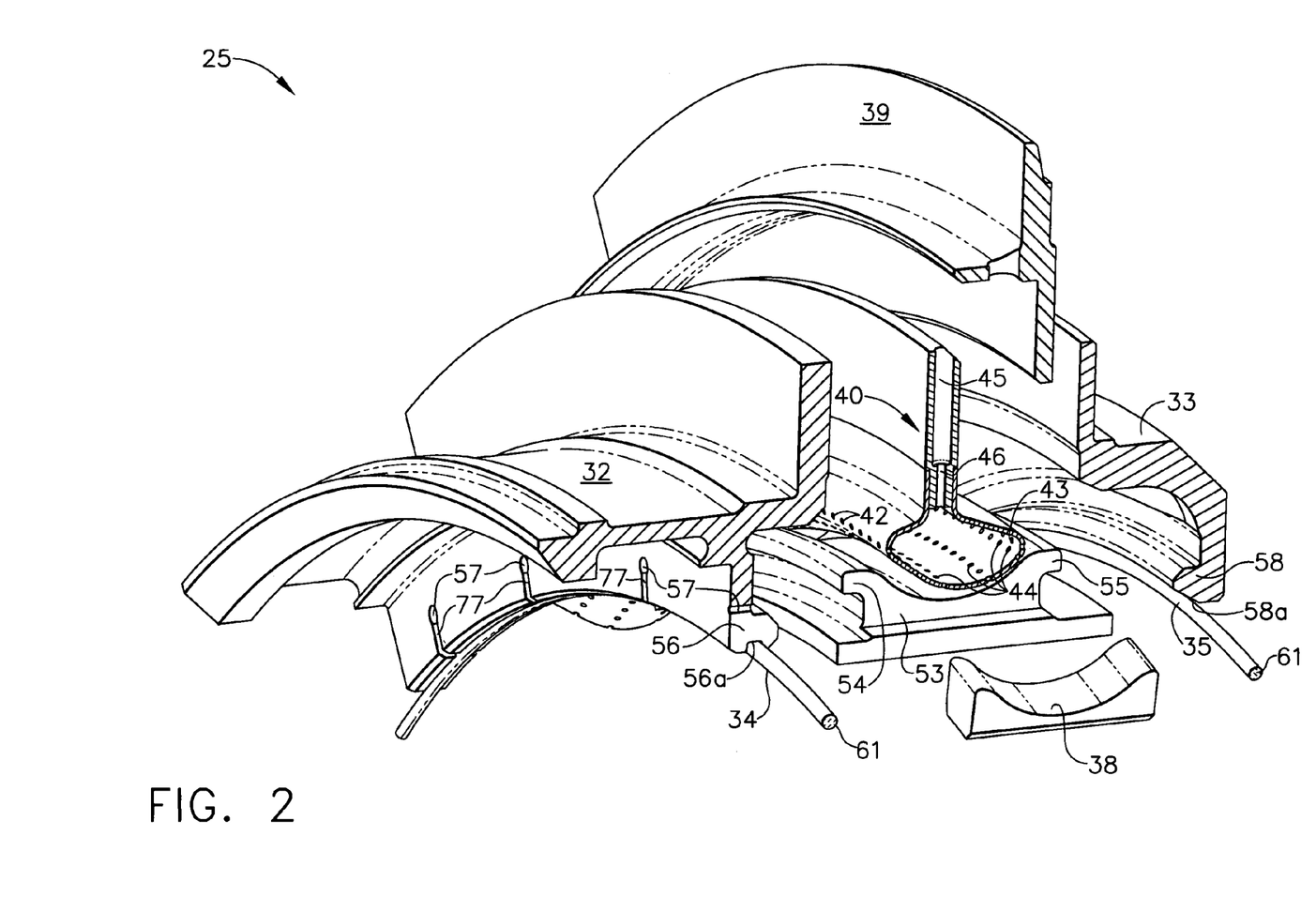
FIG. 2 is an exploded, partial view of FIG. 1 according to one embodiment of the present invention.
Figure 3:
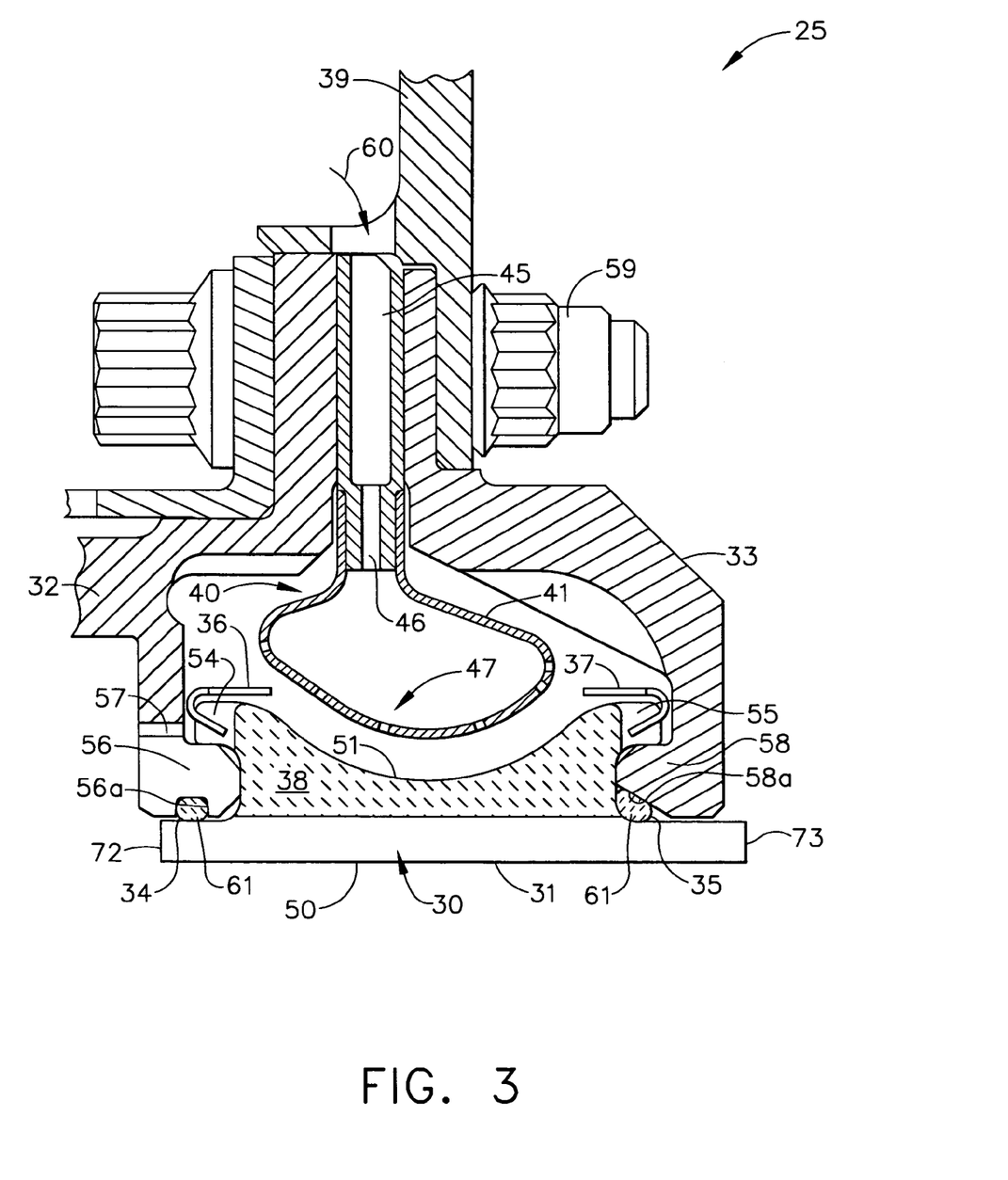
FIG. 3 is a cross sectional view of a turbine shroud assembly according to one embodiment of the present invention.

Slots 77 may be positioned at the inner diameter of the forward hanger 32 and extend radially outward, as seen in FIGS. 1 and 2. Slots 77 are known in the art and may control thermal growth and stresses. Useful slots 77 for reducing thermal expansion and stresses of the hanger may include those described in U.S. Pat. No. 5,593,276, which is incorporated herein by reference. The useful dimensions and number of slots 77 may be determined by known methods and may vary depending on application and hanger composition. For further control of thermal growth and for stress relief, stress relief openings 57 may be positioned at the radially outer end of the slots 77 and extend axially through the forward hanger 32, as shown in FIGS. 1–3. During engine operation, cooling flow 60 may pass through the slots 77 and stress relief openings 57 and may be channeled to help cool the forward hanger 32 and provide purging of the hot flow path gas away from the turbine shroud assembly 25. Methods for producing the slots 77 and stress relief openings 57 are known in the art.

Useful methods for forming the slots 77 and stress relief openings 57 may include electrical discharge machining (EDM). EDM applications require the use of a spark erosion machine. EDM applications are known in the art and include drilling by spark erosion, which may be useful for forming the stress relief openings 57. Other known EDM applications include cutting by spark erosion using a flat electrode and cutting by spark erosion using a wire, both of which may be useful in forming the slots 77.

Figure 4:
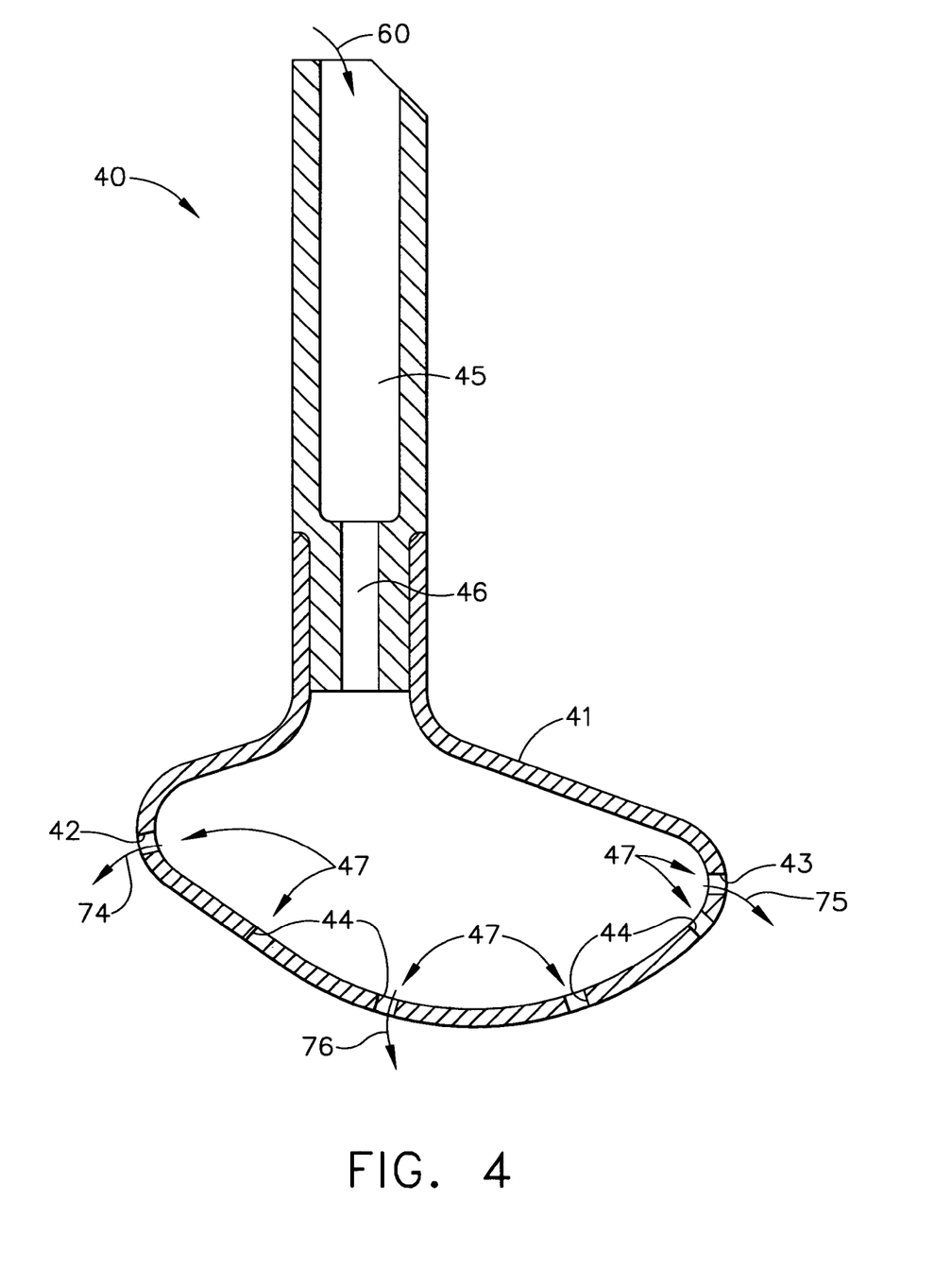
FIG. 4 is a cross sectional view of a plenum assembly according to one embodiment of the present invention.

The turbine shroud assembly 25 may comprise a plenum assembly 40, as shown in FIG. 3. The plenum assembly 40 may be positioned between and in contact with the forward hanger 32 and aft hanger 33. The plenum assembly 40 may be retained between the forward hanger 32 and aft hanger 33 by known retaining methods. In one embodiment, as shown in FIG. 3, a bolting system 59 may retain the plenum assembly 40 between the forward hanger 32 and the aft hanger 33. As shown in FIGS. 3 and 4, the plenum assembly 40 may comprise an axisymmetric plenum balloon 41, inlet openings 45, and flow metering openings 46. The axisymmetric plenum balloon 41 may have an impingement cooling array 47 there through, as shown in FIG. 4. Known manufacturing methods may be used to produce the plenum assembly 40. The plenum assembly 40 may comprise a sheet metal form and may be capable of receiving cooling flow 60.

During engine operation, a compressor (not shown) may be used to supply the cooling flow 60. The cooling flow 60 may enter the plenum assembly 40 at the inlet openings 45. The cooling flow 60 may pass through the inlet openings 45 and then enter the flow metering openings 46. The cooling flow 60 may pass through the flow metering openings 46 and then enter the axisymmetric plenum balloon 41. The cooling flow 60 may then exit the plenum assembly 40 through the impingement cooling array 47.

A vertical flange 39, shown in FIGS. 1–3, may be positioned radially out from and aft of the inlet openings 45 and may provide a robust method of pressure recovery for axial flow combustor plenums. The cooling flow 60 may be straightened as it flows radially inward through the inlet openings 45 and towards the flow metering openings 46. The inlet openings 45 may also serve to minimize the cooling flow circuit sensitivity to varying or uncertain orifice discharge coefficients that are common with combustor plenums that suffer from significant circumferential swirl. The straightening of the cooling flow 60 may be due to the dimensions of the inlet openings 45. The length of the inlet openings 45 may be at least about two inlet hole diameters in length, as an example. The cross-sectional area of the inlet openings 45 may be at least about 3 times the cross-sectional area of the flow metering openings 46. This may allow the flow metering openings 46 to predominantly control the overall flow to the axisymmetric plenum balloon 41. The plenum assembly may comprise at least one inlet opening 45 and at least one flow metering opening 46. For every inlet opening 45 there may be a corresponding flow metering opening 46 to provide a uniform flow distribution to the impingement cooling array 47. In one embodiment of the present invention the number of inlet openings 45 and corresponding flow metering openings 46 may be about 36. The diameter of the inlet openings 45 may be between about 0.05 and about 0.20 inches. The diameter of the flow metering openings 46 may be between about 0.025 and about 0.075 inches.

The axisymmetric plenum balloon 41 may comprise a sheet metal form and may follow the contour of the back side 51 of the shroud segments 30. Impingement cooling effectiveness may be a function of impingement distance. Impingement distance is the distance between the impingement opening and the surface to be cooled. The axisymmetric plenum balloon 41, by following the contours of the shroud segments 30, may reduce impingement distance and increase impingement cooling effectiveness. Known manufacturing methods may be used to form the axisymmetric plenum balloon 41. The impingement cooling array 47 may be machined into the axisymmetric plenum balloon 41 and may comprise forward hanger cooling impingement openings 42, aft hanger cooling impingement openings 43, and shroud cooling impingement openings 44.

During engine operation, a first portion 74 of cooling flow 60, as shown in FIG. 4, may pass through the forward hanger cooling impingement openings 42 and may impinge the aft side of the forward hanger 32, thereby cooling the forward hanger 32. A second portion 75 of cooling flow 60 may pass through the aft hanger cooling impingement openings 43 and may impinge the forward side of the aft hanger 33, thereby cooling the aft hanger 33. A third portion 76 of cooling flow 60 may pass through the shroud cooling impingement openings 44 and may impinge the back side 51 of the shroud segment 30, thereby cooling the shroud segment 30 and the spacer seal 38. The heat transfer to the forward hanger 32 and aft hanger 33, which govern the radial position of the shroud segments 30, which in turn govern the turbine tip clearance, may be customized by altering the number or diameter of forward hanger cooling impingement openings 42 and aft hanger cooling impingement openings 43. This unique advantage over the prior art may help maintain tight turbine tip clearance. The impingement cooling array 47 may be positioned and sized for optimal heat transfer with minimal cross flow degradation. Any known method of heat transfer analysis may be useful. Factors affecting impingement cooling effectiveness may include the rate of flow of the cooling flow 60, cross flow degradation, impingement distance, the diameters of the shroud cooling impingement openings 44, forward hanger cooling impingement openings 42, and aft hanger cooling impingement openings 43. Cross flow degradation may be due to the spent air interfering with the intended impingement surfaces while the spent air exits the turbine shroud assembly 25.

The turbine shroud assembly 25 of the present invention may reduce the amount of cooling flow to the turbine shroud assembly 25 while enabling increased turbine inlet temperatures above current production technology capabilities.

As can be appreciated by those skilled in the art, the present invention provides improved turbine shroud assemblies and methods for their production. A robust high temperature turbine shroud assembly is provided that can operate in a higher temperature environment using less cooling flow than the prior art. Also provided are turbine shroud assemblies having improved cooling efficiency. A turbine shroud assembly having controlled cooling of the forward and aft hangers is also provided. Further, a turbine shroud assembly capable of reducing turbine tip clearance is provided.

It should be understood, of course, that the foregoing relates to preferred embodiments of the invention and that modifications may be made without departing from the spirit and scope of the invention as set forth in the following claims.

We claim:

1. A turbine shroud assembly comprising:
   a plurality of shroud segments assembled circumferentially about a longitudinal engine centerline axis, at least one shroud segment having a forward hook and an aft hook;
   at least one spacer channel positioned on the radially outward side of said shroud segments, such that said at least one spacer channel is in contact with an interface of two said shroud segments;
   at least one ceramic spacer seal positioned in contact with said at least one spacer channel, such that said at least one ceramic spacer seal is within said at least one spacer channel;
   at least one forward hanger positioned radially outward from said shroud segments, said at least one forward hanger having a forward hanger rail capable of engaging said forward hook, said forward hanger rail having an o-ring groove positioned circumferentially on a radially inward side;
   at least one aft hanger positioned radially outward from said shroud segments, said at least one aft hanger having an aft hanger rail capable of engaging said aft hook, said aft hanger rail having an angled surface positioned on the forward edge of a radially inward side; and
   a plenum assembly positioned between and in contact with said at least one forward hanger and said at least one aft hanger.

2. The turbine shroud assembly of claim 1, further comprising a forward rope seal positioned between and in contact with said o-ring groove and said shroud segments.

3. The turbine shroud assembly of claim 1, further comprising an aft rope seal positioned between and in contact with said angled surface and said shroud segments.

4. The turbine shroud assembly of claim 3, wherein said aft rope seal comprises a hybrid ceramic rope.

5. The turbine shroud assembly of claim 1, wherein said shroud segments comprise a monolithic silicon nitride ceramic.

6. The turbine shroud assembly of claim 1, wherein said at least one forward hanger comprises a nickel based alloy.

7. The turbine shroud assembly of claim 1, wherein said at least one aft hanger comprises a nickel based alloy.

8. The turbine shroud assembly of claim 1, wherein said at least one forward hanger has a plurality of slots positioned at an inner diameter and extending radially outward.

9. The turbine shroud assembly of claim 1, wherein said at least one ceramic spacer seal comprises a monolithic silicon nitride ceramic.

10. The turbine shroud assembly of claim 1, further comprising a thermal barrier coating (TBC) positioned on a radially inward side of said shroud segments.

11. A turbine shroud assembly comprising:
a plurality of ceramic shroud segments assembled circumferentially about a longitudinal engine centerline axis, each said ceramic shroud segment having a forward hook and an aft hook;and
a plurality of ceramic spacer seals positioned in contact with said ceramic shroud segments, such that each one said ceramic spacer seal is in contact with the radially outward side of two said ceramic shroud segments.

12. The turbine shroud assembly of claim 11, further comprising a forward hanger radially outward from and engaging said forward hook, and comprising an aft hanger radially outward from and engaging said aft hook.

13. The turbine shroud assembly of claim 12, further comprising a forward rope seal positioned between said ceramic shroud segments and said forward hanger such that said forward rope seal is radially inward from said forward hanger.

14. The turbine shroud assembly of claim 12, further comprising an aft rope seal positioned between said ceramic shroud segments and said aft hanger such that said aft rope seal is radially inward from said aft hanger.

15. An apparatus for cooling turbine engine shroud segments and hanger rails comprising:
a plenum comprised of enclosing surfaces of the segments and hanger rails;
an axisymmetric plenum balloon positioned in the plenum and having an impingement cooling array there through;
said impingement cooling array comprising holes with axes perpendicular to an outer surface of the axisymmetric plenum balloon;
a plurality of flow metering openings in fluid communication with said axisymmetric plenum balloon;
a plurality of inlet openings in flow communication with said flow metering openings; and
wherein an outer surface of the axisymmetric plenum balloon follows a contour of an internal surface of the plenum so that each of the holes of the impingement array are oriented to provide flow in a direction that is perpendicular to a corresponding underlying portion of the internal surface of the plenum.

16. The apparatus of claim 15, wherein said impingement cooling array comprises a plurality of forward hanger cooling impingement openings, a plurality of aft hanger cooling impingement openings, and a plurality of shroud cooling impingement openings.

17. The apparatus of claim 15, wherein a cross-sectional area of said inlet openings is at least about three times a cross-sectional area of said flow metering openings and wherein the inlet openings are axially aligned with the flow metering openings.

18. The apparatus of claim 17, further comprising a vertical flange positioned radially outward from and aft of said inlet openings.

19. The apparatus of claim 15, wherein said axisymmetric plenum balloon comprises a sheet metal form.

20. A rope seal apparatus for use between a turbine shroud and hangers comprising:
first and a second compressed hybrid ceramic ropes positioned between and in contact with said turbine shroud and said hangers, such that said hangers are radially outward from said compressed hybrid ceramic ropes;
the first hybrid ceramic rope being adjacent the forward hanger;
the second hybrid ceramic rope being adjacent the aft hanger;
the second hybrid ceramic rope being compressed to a greater degree than the first hybrid ceramic rope.

21. The rope seal apparatus of claim 20, wherein said turbine hanger comprises a forward hanger having a circumferential o-ring groove positioned on a radially inward side, and said compressed hybrid ceramic rope is in contact with said circumferential o-ring groove.

22. The rope seal apparatus of claim 20, wherein said turbine hanger comprises an aft hanger having a circumferential angled surface positioned on a forward edge of the radially inward side, and said compressed hybrid ceramic rope is in contact with said angled surface.

23. The rope seal apparatus of claim 20, wherein said turbine shroud comprises a plurality of ceramic shroud segments.

24. A method of shielding a turbine engine from a hot gas flow path there through comprising the steps of:
providing a plurality of ceramic shroud segments assembled circumferentially about a longitudinal engine centerline axis through said hot gas flow path, a forward hanger radially outward from and forward of said ceramic shroud segments, an aft hanger radially outward from and aft of said ceramic shroud segments, and a plenum assembly between and in contact with said forward hanger and said aft hanger;and
supplying a cooling flow to said plenum assembly such that said cooling flow impinges said ceramic shroud segments, said forward hanger, and said aft hanger.

25. The method of claim 24, further comprising a step of positioning a hybrid rope seal between said forward hanger and said ceramic shroud segments.

26. The method of claim 24, further comprising a step of positioning a hybrid rope seal between said aft hanger and said ceramic shroud segments.

27. The method of claim 24, further comprising a step of positioning a ceramic spacer seal in contact with a radially outward side of each interface of two ceramic shroud segments.

28. The method of claim 27, wherein said ceramic spacer seals comprise a monolithic silicon nitride ceramic.

29. The method of claim 24, wherein said plenum assembly comprises an axisymmetric plenum balloon having an impingement cooling array there through, a plurality of flow metering openings in fluid communication with said axisymmetric plenum balloon, and a plurality of inlet openings in flow communication with said flow metering openings.

* * * * *